US008913832B2

(12) United States Patent
Yipu

(10) Patent No.: US 8,913,832 B2
(45) Date of Patent: Dec. 16, 2014

(54) METHOD AND DEVICE FOR INTERACTING WITH A MAP

(75) Inventor: Gao Yipu, Beijing (CN)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 13/563,008

(22) Filed: Jul. 31, 2012

(65) Prior Publication Data

US 2012/0299959 A1 Nov. 29, 2012

Related U.S. Application Data

(62) Division of application No. 12/086,312, filed as application No. PCT/IB2005/004018 on Dec. 8, 2005.

(51) Int. Cl.
*G06K 9/00* (2006.01)
*G06K 9/22* (2006.01)
*G06F 3/041* (2006.01)
*G06F 3/0488* (2013.01)
*G01C 21/36* (2006.01)

(52) U.S. Cl.
CPC .............. *G06F 3/0412* (2013.01); *G06K 9/222* (2013.01); *G06F 3/04883* (2013.01); *G01C 21/3682* (2013.01)
USPC .......................................... 382/187; 715/864

(58) Field of Classification Search
USPC .......................................... 382/187; 715/864
See application file for complete search history.

(56) References Cited

U.S. PATENT DOCUMENTS

| | | | |
|---|---|---|---|
| 4,860,372 A | 8/1989 | Kuzunuki et al. | |
| 5,267,327 A | 11/1993 | Hirayama | |
| 5,276,794 A | 1/1994 | Lamb, Jr. | |
| 5,389,745 A | 2/1995 | Sakamoto | |
| 5,455,901 A | 10/1995 | Friend et al. | |
| 5,502,461 A | 3/1996 | Okamoto et al. | |
| 5,864,636 A | 1/1999 | Chisaka | |
| 5,889,888 A | 3/1999 | Marianetti, II et al. | |
| 7,626,515 B1 * | 12/2009 | Langner et al. ............... | 340/971 |
| 7,646,914 B2 | 1/2010 | Clausi et al. | |
| 8,140,994 B2 * | 3/2012 | Feldman et al. ............... | 715/780 |
| 8,508,485 B2 * | 8/2013 | Huh ............................. | 345/173 |
| 2002/0028018 A1 | 3/2002 | Hawkins et al. | |
| 2003/0007018 A1 | 1/2003 | Seni et al. | |
| 2003/0093419 A1 * | 5/2003 | Bangalore et al. ................ | 707/3 |

FOREIGN PATENT DOCUMENTS

| | | |
|---|---|---|
| JP | 01-204195 | 8/1989 |
| JP | 06-251198 | 9/1994 |
| JP | 6-251198 A | 9/1994 |
| JP | 06-289984 | 10/1994 |

(Continued)

OTHER PUBLICATIONS

Foley et al., "Input Devices, Interaction Techniques, and Interaction Tasks", Computer Graphics: Principles and Practice, Jul. 1, 1995, pp. 347-389.

*Primary Examiner* — John Strege
(74) *Attorney, Agent, or Firm* — Ziegler IP Law Group, LLC

(57) ABSTRACT

The present invention relates to an electronic device that comprises a display and a method for such an electronic device. The method includes displaying a map that illustrates a plurality of streets and establishments that are situated on the streets. The method also includes receiving a character input in a character input area of the display and a gesture input outside the character input area of the display. One or more establishments associated with the character input is displayed on the map.

20 Claims, 10 Drawing Sheets

(56) References Cited

FOREIGN PATENT DOCUMENTS

| JP | 07-152476 | 6/1995 |
| JP | 08138193 | 5/1996 |
| JP | 08212238 | 8/1996 |
| JP | 2002228459 | 8/2002 |
| JP | 2005140570 | 6/2005 |
| WO | WO 2005088254 A1 * | 9/2005 | ............ G10C 21/34 |
| WO | 2005096217 | 10/2005 |

* cited by examiner

METHOD AND DEVICE FOR INTERACTING WITH A MAP

CROSS REFERENCE TO RELATED APPLICATIONS

This application is a divisional application of application Ser. No. 12/086,312 filed on Jul. 3, 2009, which is the U.S. National Stage of International Application Number PCT/IB005/004018 filed on Dec. 8, 2005 which was published in English on Jun. 14, 2007 under International Publication Number WO 2007/066168.

FIELD OF THE INVENTION

Embodiments of the present invention relate to improved text entry for electronic devices. In particular, they relate to a method for text entry into an electronic device, an electronic device, a memory stored with program instructions for controlling an electronic device and a graphical user interface.

BACKGROUND TO THE INVENTION

Handwriting recognition is often used to allow a user to input information into electronic devices. Problems arise when inputting a series of characters, for example a word or a telephone number, into such devices, as the process of recognizing a series of characters can often be slow and inaccurate.

SUMMARY OF THE INVENTION

According to one embodiment of the invention there is provided a method of inputting a series of characters into an electronic device comprising a display, the method comprising: detecting a first input associated with a first one of a plurality of discrete areas of the display for entering characters on the display; and recognizing the first input in the first one of the plurality of discrete areas as a first character input while a second one of the plurality of discrete areas is operable to detect a second input for recognition as a second character input, the recognition of the second character input occurring separately to the recognition of the first character input.

This provides the advantage that each character input is associated with a different one of the plurality of discrete areas. This allows the processor to recognize each character input independently of other character inputs so that a user can make new inputs while, at the same time, the processor can recognize the previous character inputs. This makes the process of entering a series of characters quicker and mimics the process of normal handwriting.

According to another embodiment of the invention there is provided an electronic device comprising: a display having a plurality of discrete areas for entering a series of characters; a user input for entering characters via the plurality of discrete areas; detection means for detecting a first input associated with a first one of the plurality of discrete areas; and processing means for recognizing the first input in the first one of the plurality of discrete areas as a first character input while the detection means is operable to detect a second input, in a second one of the plurality of areas, for recognition as a second character input, the recognition of the second character input occurring separately to the recognition of the first character input.

According to another embodiment of the present invention there is provided a computer program comprising program instructions for controlling an electronic device comprising a display which, when loaded into a processor, comprises: means for detecting a first input associated with a first one of a plurality of discrete areas of a display for entering characters; and means for recognizing the first input in the first one of the plurality of discrete areas as a first character input while a second one of the plurality of discrete areas is operable to detect a second input for recognition as a second character input, the recognition of the second character input occurring separately to the recognition of the first character input.

According to another embodiment of the present invention there is provided a graphical user interface, comprising a display, that: enables the detection of a first input associated with a first one of a plurality of discrete areas of the display for entering characters on the display; and enables the recognition of the first input in the first one of the plurality of discrete areas as a first character input while a second one of the plurality of discrete areas is operable to detect a second input for recognition as a second character input, the recognition of the second character input occurring separately to the recognition of the first character input.

According to a further embodiment of the present invention there is also provided a method of inputting a series of characters comprising an ordered sequence of characters including a first character, a second character and a third character comprising: providing an ordered sequence of areas including a first area, a second area and a third area on a display, where there is a correspondence between each character and each area of the display such that the first character is associated with the first area, the second character is associated with the second area and the third character is associated with the third area; and wherein a traced input in the first area defines the first character, a traced input in the second area defines the second character and a traced input in the third area defines the third character and the input in each area is processed separately from the inputs in the other areas.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

The Figures illustrate a method of inputting a series of characters into an electronic device 1 comprising a display 11, the method comprising: detecting a first input associated with a first one of a plurality of discrete areas 53 of the display 11 for entering characters on the display 11; and recognizing the first input in the first one of the plurality of discrete areas 53 as a first character input 59 while a second one of the plurality of discrete areas 53 is operable to detect a second input for recognition as a second character input 59, the recognition of the second character input 59 occurring separately to the recognition of the first character input 59.

Figure 1:
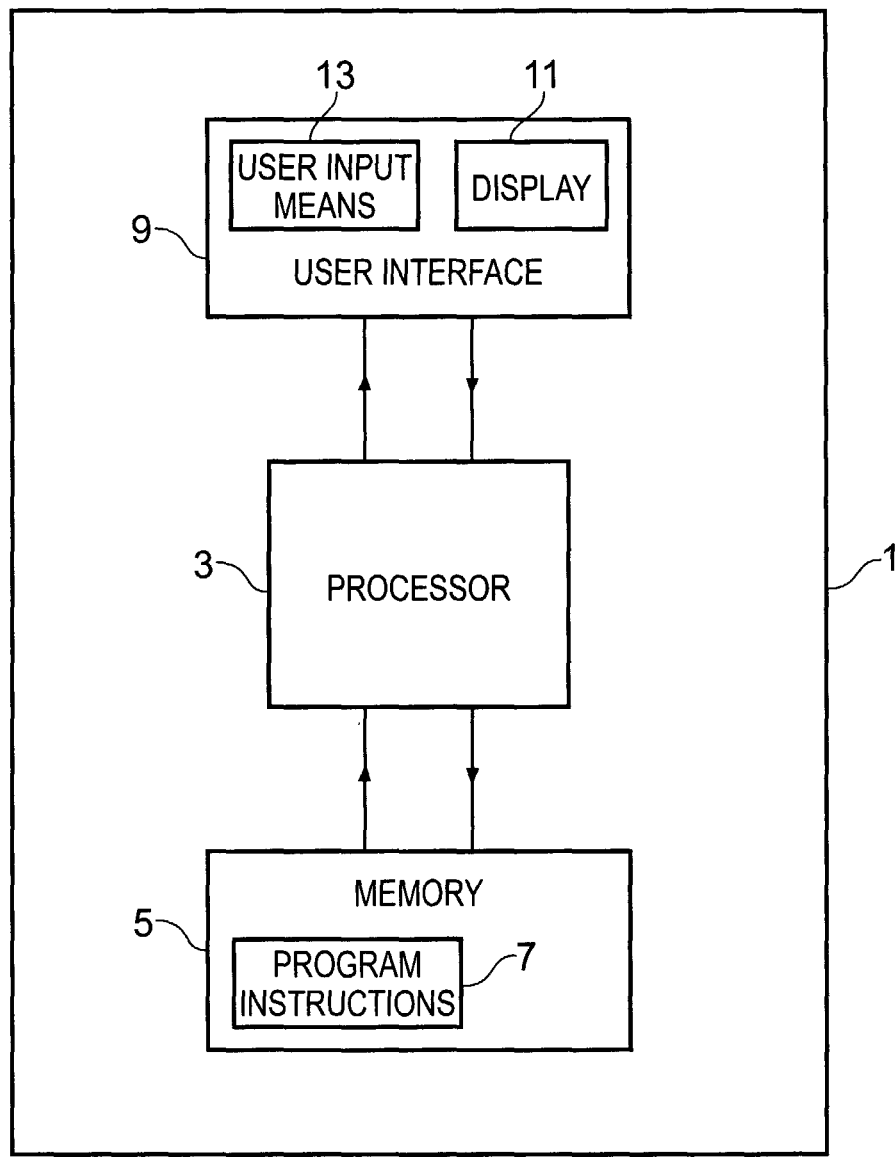
FIG. 1. schematically illustrates an electronic device.

FIG. 1 schematically illustrates an electronic device 1. Only the features referred to in the following description are illustrated. It should, however, be understood that the device 1 may comprise additional features that are not illustrated. The electronic device 1 may be, for example, a personal computer, a personal digital assistant, a mobile cellular telephone, a television, a video recorder in combination with a television, or any other electronic device that uses a graphical user interface.

The illustrated electronic device 1 comprises: a processor 3, a memory 5 and a user interface 9. The user interface 9 comprises a display 11 and user input means 13. The display 11 may be a touch sensitive display. The user input means 13 may comprise one or more areas on the touch sensitive display 11. The user input means 13 may also comprise other types of user input for example, a key pad or a joystick. The processor 3 is connected to receive input commands from the user interface 9 and to provide output commands to the display 11. The processor 3 is also connected to write to and read from the memory 5.

The display 11 presents a graphical user interface (GUI) to a user. Examples of GUIs according to embodiments of the invention are illustrated in FIGS. 3 and 5.

The memory 5 stores computer program instructions 7 which, when loaded into the processor 3, enable the processor 3 to control the operation of the device 1 as described below. The computer program instructions 7 provide the logic and routines that enables the electronic device 1 to perform the methods illustrated in FIGS. 2 and 4.

The computer program instructions 7 may arrive at the electronic device 1 via an electromagnetic carrier signal or be copied from a physical entity such as a computer program product, a memory device or a record medium such as a CD-ROM or DVD.

Figure 2:
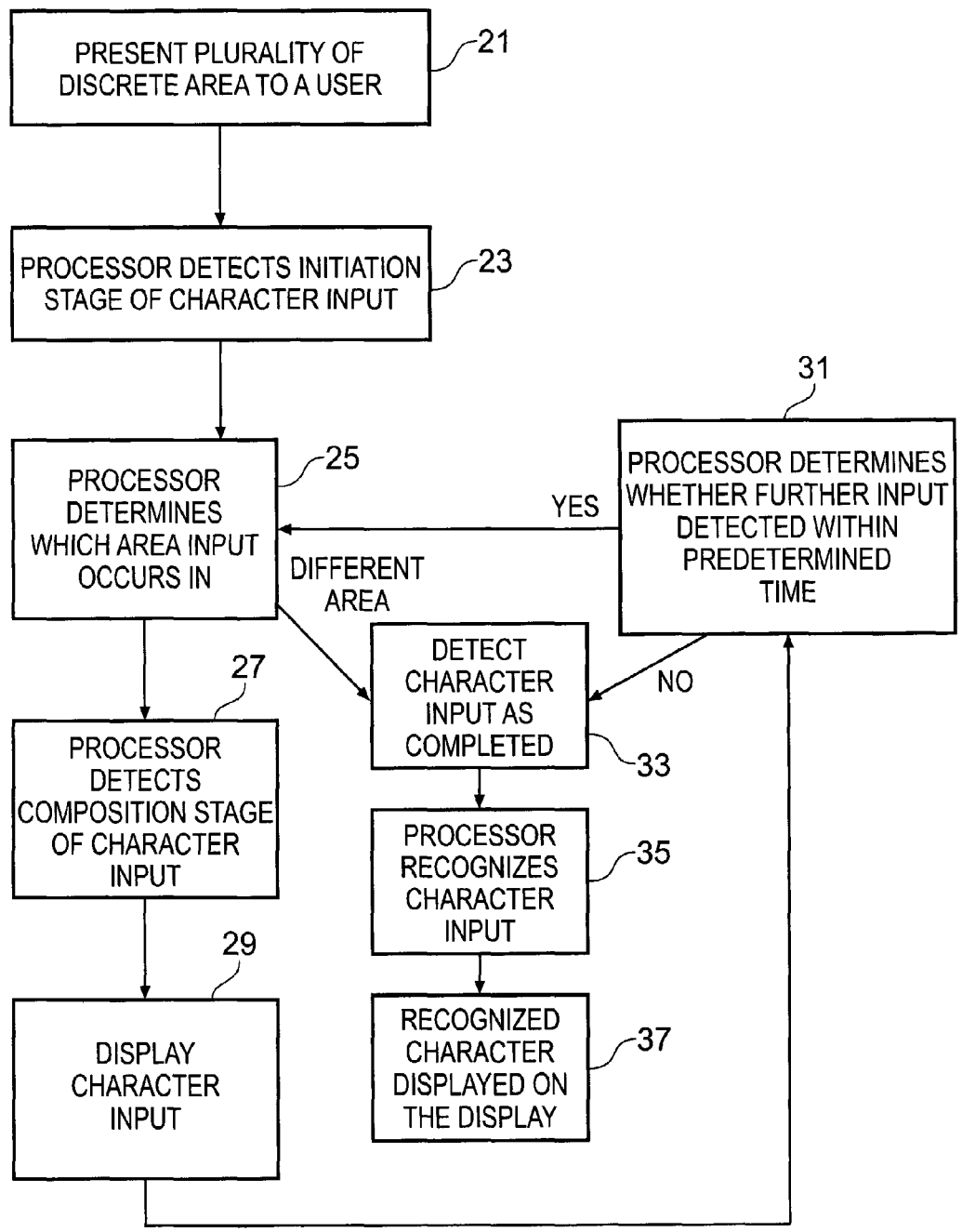
FIG. 2. illustrates a flow chart showing method steps of a first embodiment of the present invention.

A method of controlling the device 1, according to a first embodiment of the present invention, is illustrated schematically in FIG. 2.

At step 21 the processor 3 controls the display 11 to present to a user a plurality of discrete areas 53 for inputting a series of characters 59 using handwriting recognition. A character 59 may be any written symbol which is used to convey information. For example a character 59 may be any roman character, punctuation mark, Arabic numeral, numerical symbol or Chinese character. A character may also be a shorthand or abbreviated symbol used to represent a character or a group of characters.

The plurality of discrete areas 53 may be displayed as a series of demarcated areas on the display 11. The demarcated areas may extend contiguously along an axis such that the process of inputting a series of characters in the areas mimics that of ordinary handwriting.

At step 23 the processor 3 detects the initiation stage of a character input. The initiation stage may be a user touching the touch sensitive display 11 with an object such as a stylus or their finger. The processor 3 determines, at step 25, which of the plurality of discrete areas 53 the initiation stage occurred in. Any further input following the initiation stage will be associated with this discrete area.

The processor 3 then detects, at step 27, the composition stage of a character input. The composition stage may comprise the user making a drag action or a series of drag actions by tracing a stylus or their finger across the touch sensitive display 11. The composition stage of the character input is associated with the discrete area in which the initiation stage of the input occurred however the drag actions need not be restricted to within the boundaries of this area. The drag actions create a trace 59 which is recorded by the processor 3 and displayed on the display 11 at step 29.

At step 31 the processor 3 determines whether any further input occurs within a predetermined time. If an input does occur then the processor 3 returns to step 25 and determines which of the plurality of discrete areas the input occurred in. If no further input occurs within the predetermined time then the processor 3 detects, at step 33, that character input is finished and the processor 3 begins the recognition process.

If the input occurs in the same discrete area then the processor 3 will detect this as a continuation of the character input. For example it could be the dotting of an "i" or the crossing of a "t". If the input occurs in a different discrete area then the processor 3 will detect this as the initiation stage of a different character input and will detect, at step 33, the first character input as completed. The processor 3 will then begin the recognition process of the first character input. While the processor 3 is recognizing the first character input associated with the first discrete area, the user is able to make the next character input in a different discrete area.

The recognition process comprises, at step 35, the processor 3 recognizing the character input as a character or a group of characters. This may be achieved by means of a look up table. At step 37 the processor 3 controls the display 11 to remove the handwritten character input trace 59 and replace it with the recognized typographical character 61.

Steps 25 to 31 can be repeated as many times as necessary. This allows a series of characters to be entered.

Figure 3A:
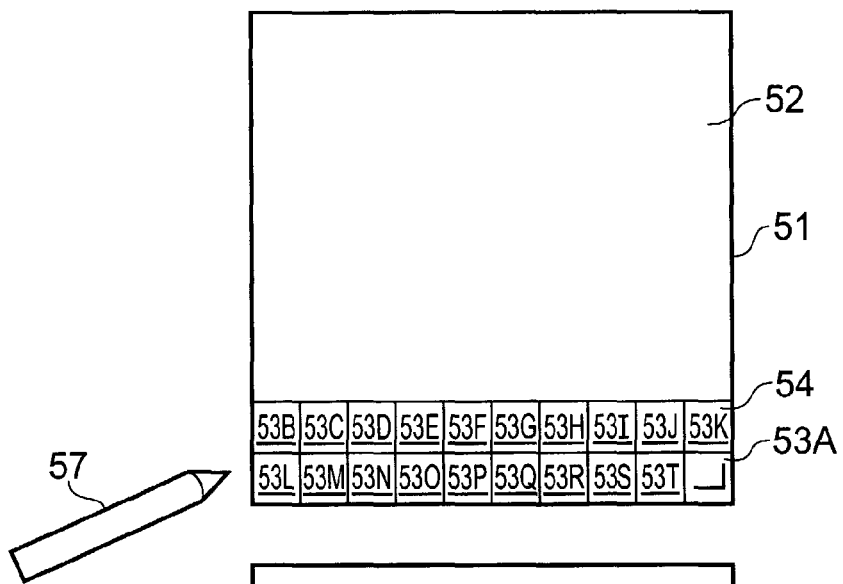
FIG. 3. Illustrates a user using a graphical interface in accordance with the first embodiment of the present invention.

FIGS. 3A to 3L illustrate an embodiment of a graphical user interface (GUI) 51 according to a first embodiment of the present invention and a user using the GUI 51. FIG. 3A illustrates the GUI 51 presented by the display 11. The GUI 51 comprises a first portion 52, which can display text. This text may be text which has been entered by a user or text which is stored in the memory 5 of the device 1. In FIG. 3A no text has been input yet, so the first area 52 is blank. The GUI also comprises a second portion 54 which is used by the user for entering a series of characters using handwriting recognition. This second portion 54 comprises a plurality of discrete areas 53A, 53B, 53C . . . 53T, henceforth collectively referred to as 53. In this embodiment the discrete areas are indicated on the display 11 as a plurality of rectangular boxes extending in two horizontal rows across the display 11. Other shapes and configurations of the areas may be used in other embodiments.

FIG. 3A also illustrates a stylus 57 which may be used to make character inputs in the plurality of discrete areas 53. In other embodiments a user may be able to write on the display 11 using their finger.

One of the plurality of discrete areas, in this particular embodiment the lower right hand area 53A, is operable as an enter button such that actuation of this area 53A by touching it with the stylus 57 causes any characters which have been input by the user in the plurality of areas 53 to be entered into the text in the first portion 52. In other embodiments the characters may be entered by activating a different portion of the display 11 or by using different user input means.

Figure 3B:
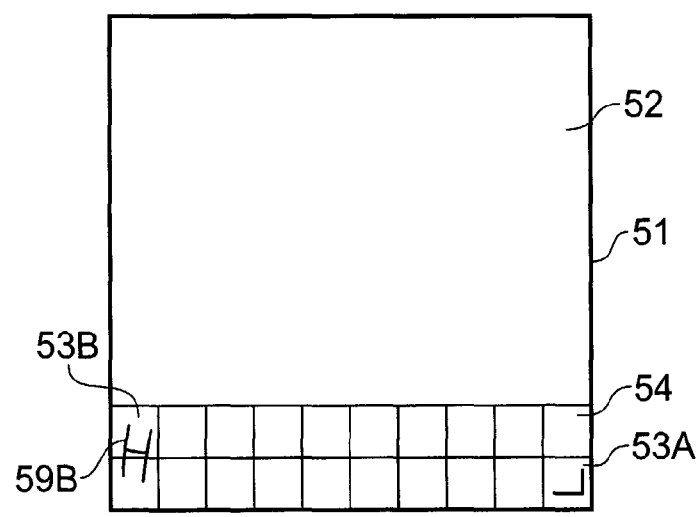

FIG. 3B illustrates the GUI 51 after a first character input 59B, a letter "H" has been made by the user in a first one of the plurality of discrete areas 53B. The input has been made by making a series of drag actions across the display 11 with the stylus 57. A trace 59 indicative of these drag actions is displayed on the display 11.

In FIG. 3B the trace of character input 59B extends out of the area 53B. However, as each of the pen down actions of the character input 59B, occurred in area 53B then each of the drag actions are determined as being associated with area

53B. This means that the user is not restricted by the size of the areas 53 when inputting characters, nor does the user have to be particularly careful when inputting characters to avoid going over the lines.

Figure 3C:
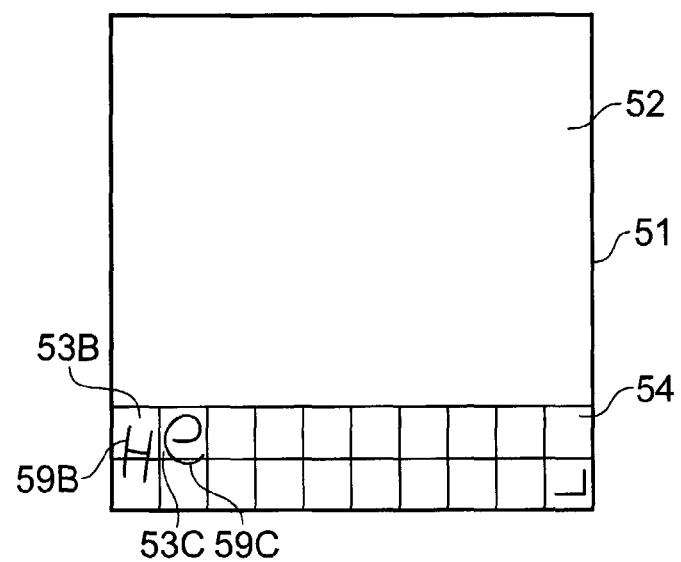

FIG. 3C illustrates the user interface after a user has made a second character input 59C, in this case a letter "e". As the initiation stage of character input 59C occurred in discrete area 53C the character input 59C is associated with discrete area 53C. Once the user has begun character input 59C the processor 3 detects that character input 59B is complete and begins the recognition process.

Figure 3D:
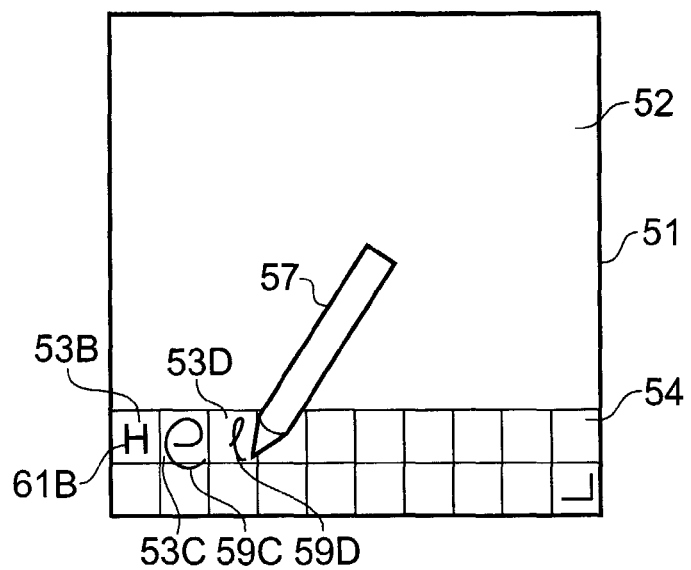

In FIG. 3D the user has begun a third character input 59D, a letter "I" in a third discrete area 53D. The processor 3 has completed the recognition of the first character input 59B and has replaced the handwritten trace in area 53B with a typographical character 61B corresponding to the handwritten input 59B.

Figure 3E:
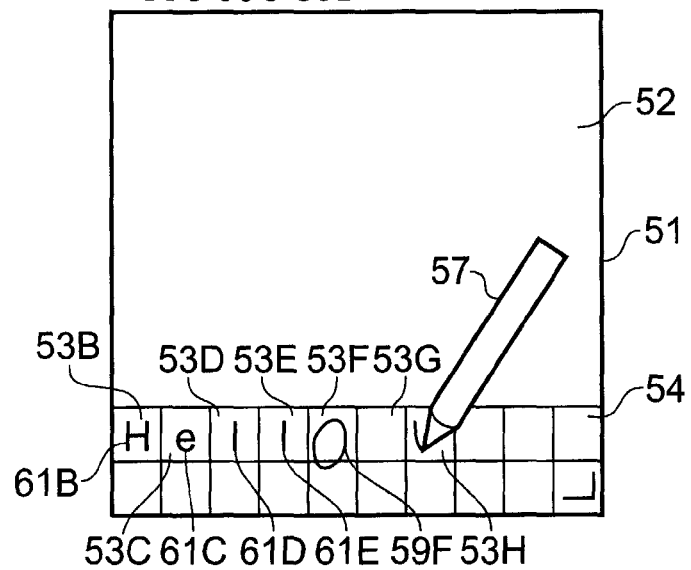

In FIG. 3E the user has made two more character inputs, an "I" in area 53E and an "o" in area 53F. The processor 3 has completed the recognition process of the first four character inputs and has replaced each of the handwritten traces with typographical characters in each of the respective discrete areas. The user then wishes to begin inputting a new word. To separate the two words the user simply leaves the area 53G adjacent to the area 53F associated with the last letter of the previous word empty and begins a new input in the next but one area 53H. The processor 3 will detect that area 53G has no character input associated with it but the two neighbouring areas 53F and 53H each have a character input associated with them so that area 53G is recognized as a space. This allows a user to input more than one word at a time and allows for a more fluid method of entering characters.

Figure 3F:
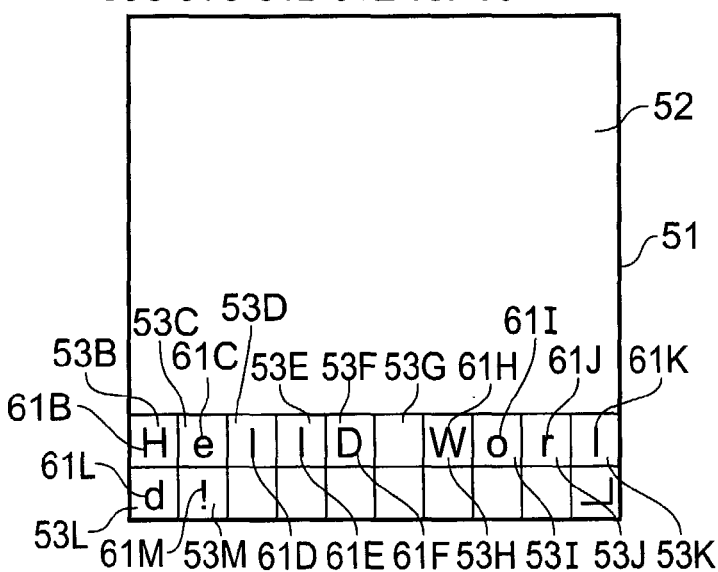

In FIG. 3F the user has input characters "W", "o", "r", "I", "d" and "!" in the discrete areas 53H, 53I, 53J, 53L and 53M, respectively. The processor 3 has completed the recognition process for each of the character inputs and the handwritten traces 59 on the display 11 have been replaced by the typographical characters 61.

Figure 3G:
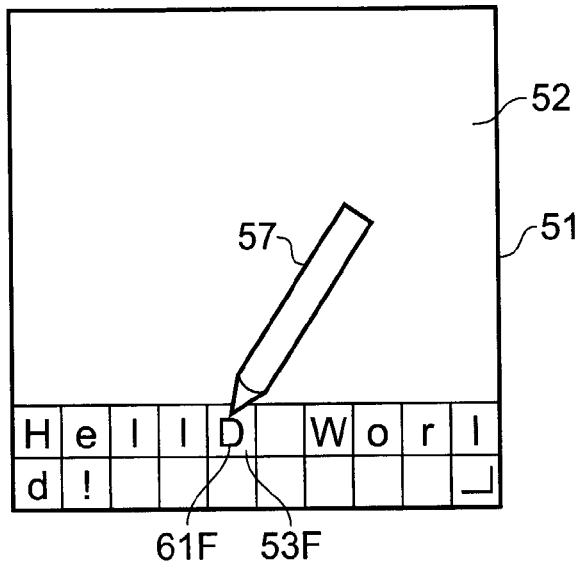
Figure 3H:
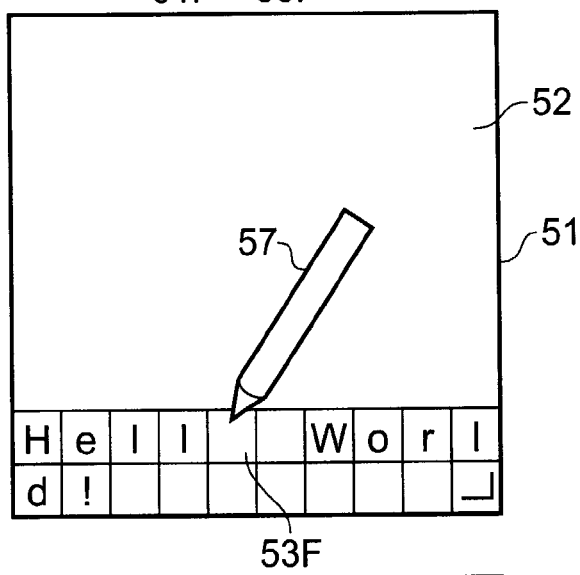

The processor 3 has incorrectly recognized the character input 59F associated with the fifth discrete area 53F as a "D" instead of an "o". The user can correct this error by making a new character input in the area 53F associated with the incorrectly recognized character. FIG. 3G illustrates a user touching the display 11 with the stylus 57 in the area 53G associated with the incorrectly recognized character. When the processor 3 detects this input it will delete the recognized character and erase the typographical character 61 F from the display 11 leaving the area 53F blank, as illustrated in FIG. 3H, so that a user can begin making a new character input in this area. In some embodiments the user may have to hold the stylus 57 in position for a predetermined length of time before the recognized character is erased. This avoids accidental deletion of recognized characters.

Figure 3I:
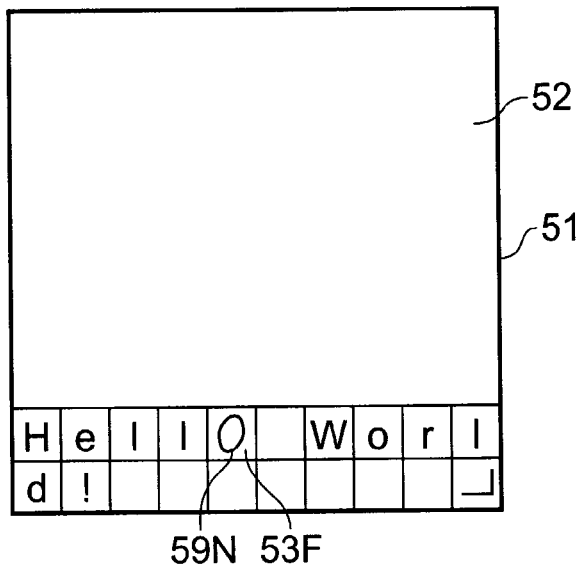
Figure 3J:
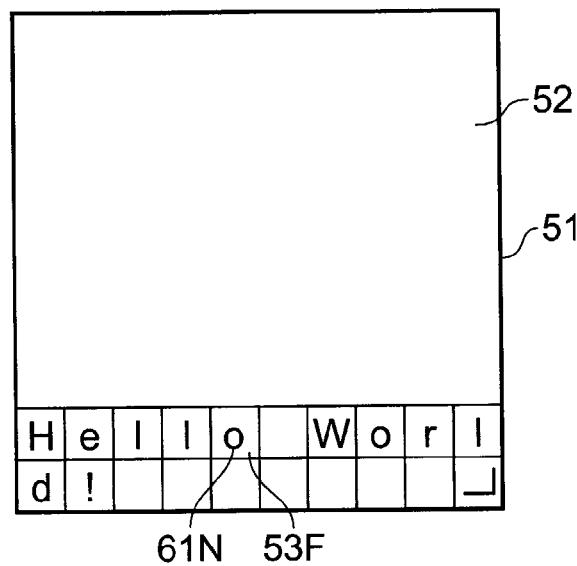

In FIG. 3I the user has made a new character input 59N in the discrete area 53F. As with the previous character inputs the processor 3 recognizes the character input and replaces the handwritten trace 59N in area 53F with a typographical character 61 N, as illustrated in FIG. 3J.

Figure 3K:
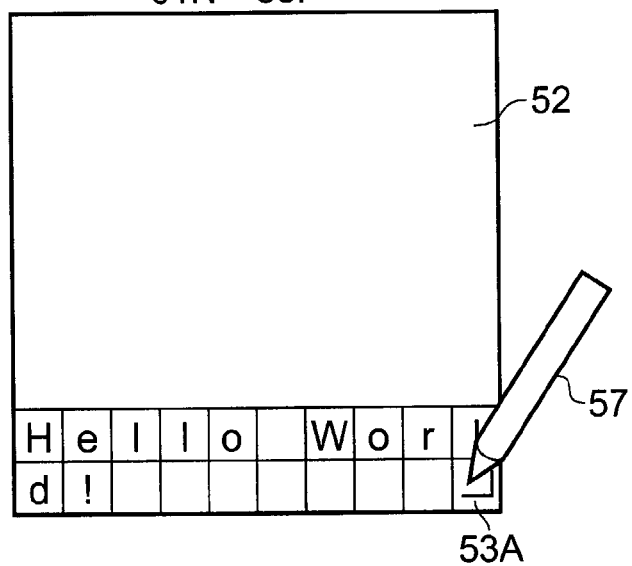
Figure 3L:
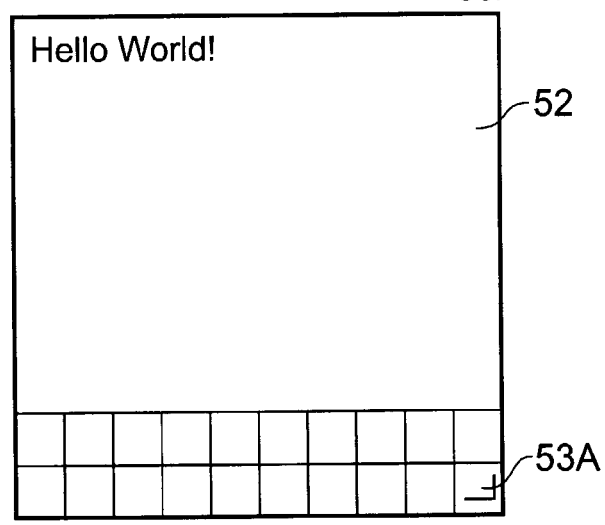

Once all the characters have been correctly recognized the user can enter the series of characters into the first portion of the display 52. In the embodiment illustrated this is achieved by touching the enter area 53A with the stylus 57, as illustrated in FIG. 3K. In some embodiments it may be necessary for the user to hold the stylus in the enter area 53A for a predetermined time to avoid entering characters unintentionally. Once the characters have been entered they are displayed in the first portion of the display 52 as illustrated in FIG. 3L and the typographical characters 61 are erased from the discrete areas 53.

Figure 4:
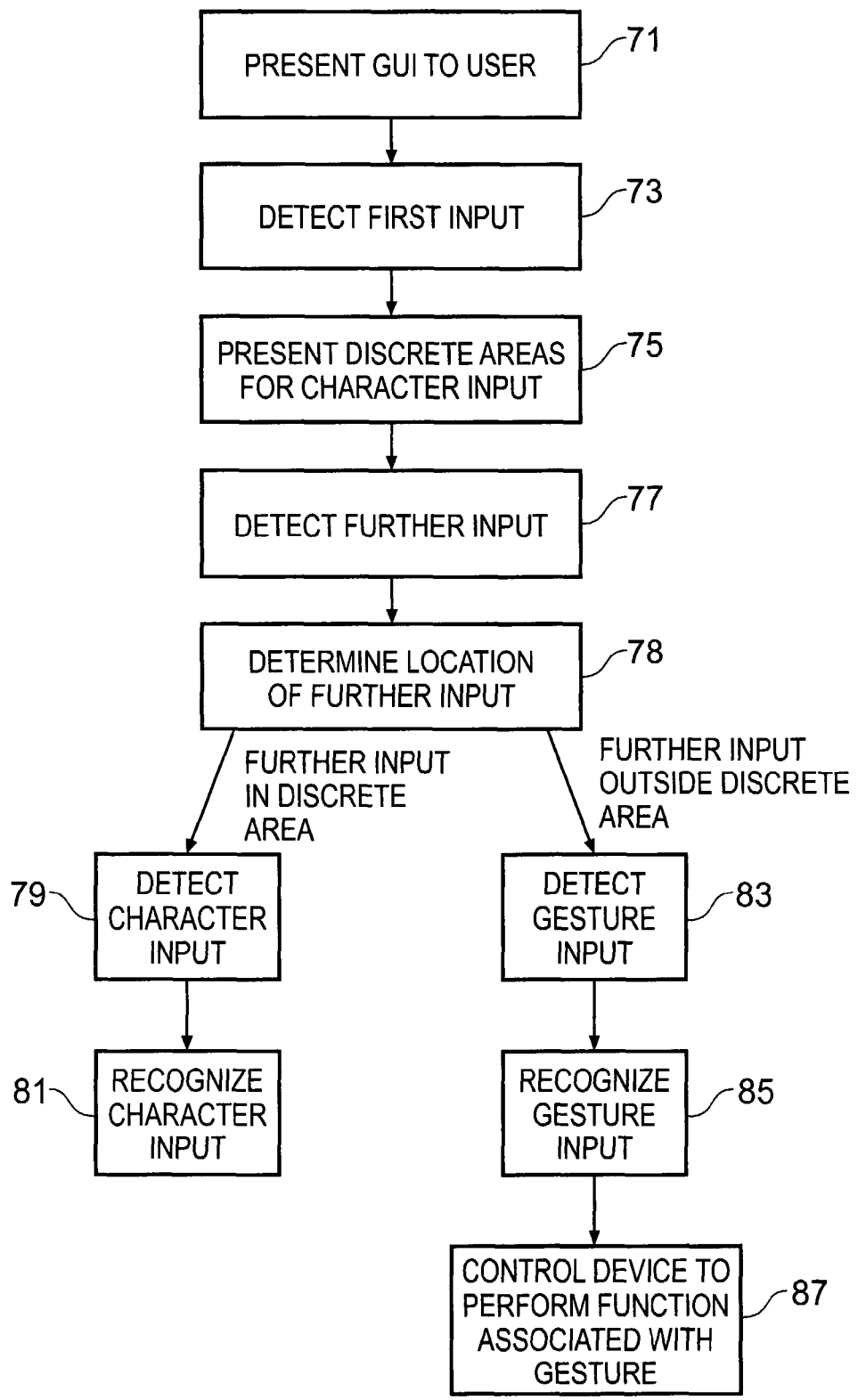
FIG. 4. illustrates a flow chart showing method steps of a second embodiment of the present invention.

FIG. 4 illustrates a method according to a second embodiment of the invention. In this embodiment the processor 3 can recognize an input made by the user as either a character or a gesture. The characters may be, as in the first embodiment, any written symbol used to convey information. A gesture may be an input which causes the device 1 to perform a function.

At step 71 the touch sensitive display 11 presents to a user a GUI 91. An example of a GUI 91 suitable for use with this second embodiment is illustrated in FIG. 5. At step 73 the processor 3 detects a first input. This input may be, for example, holding a pen or stylus on the GUI 91 for a predetermined length of time.

In response to the detection of this first input the processor 3 controls the display, 11, at step 75, to present to a user, a plurality of discrete areas 97 for character input using handwriting recognition. These areas may be displayed on the display 11 as a series of boxes as illustrated in FIG. 5.

At step 77 the processor 3 detects a further input. This input may be the initiation stage of a character input or a gesture input, that is, it may be the user touching the display 11 with a pen or stylus. At step 78 the processor 3 determines whether or not this input occurred inside one of the plurality of discrete areas 97. If the input occurred within any of the plurality of discrete areas 97 then the input made by the user is recognized as a character input. The processor 3 detects a character input at step 79, this character input may comprise a series of traces across the touch sensitive display 11. These traces may be displayed on the display 11. At step 81 the processor 3 recognizes the character input as a character, this may be done by using a look up table.

If the input occurred outside the plurality of discrete areas 97 then the processor 3 recognizes the input made by the user as a gesture input. At step 83 the processor 3 detects a gesture input which may comprise a trace or a series of traces across the touch sensitive display 11. At step 85 the processor 3 recognizes this input as a gesture input. This may be done by using a look up table, preferably the processor 3 has a separate look up table for gesture inputs than it does for character inputs. At step 87 the processor 3 can control the device 1 to perform the function associated with the gesture.

Figure 5A:
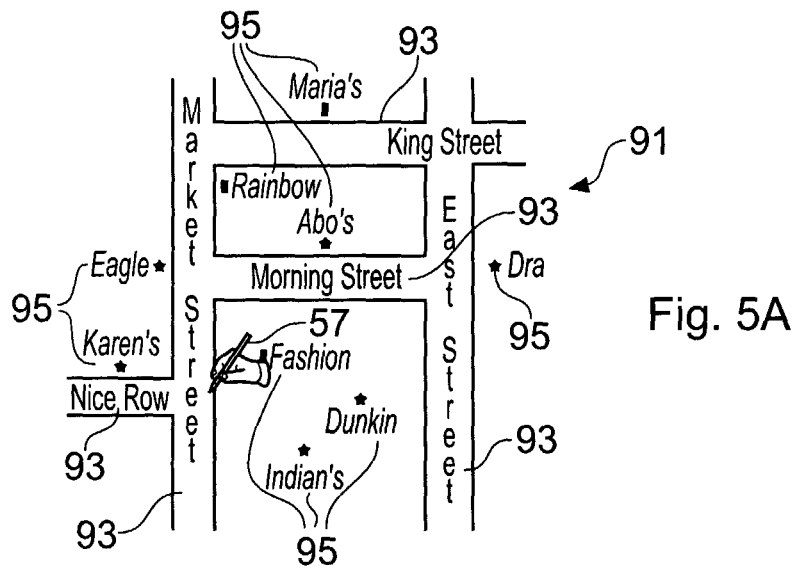
FIG. 5. illustrates a user using a graphical interface in accordance with the second embodiment of the invention.

FIG. 5A illustrates an embodiment of a GUI 91 presented by the touch sensitive display 11 in accordance with the second embodiment of the invention. In this GUI 91 a map is displayed illustrating a number of streets 93 and various establishments such as shops and restaurants situated on those streets 93.

Figure 5B:
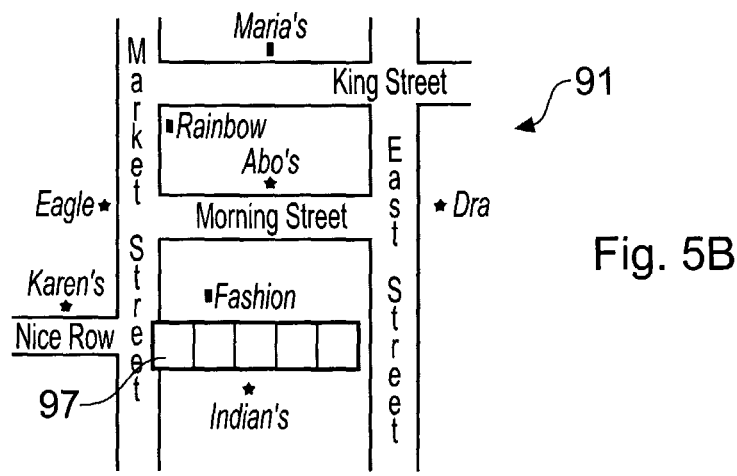

In FIG. 5A the user is using a stylus 57 to make a first input. This input may be holding the stylus 57 in position for a predetermined length of time. In response to the detection of this first input the processor 3 controls the display 11 to present to a user a plurality of discrete areas 97 for character input using handwriting recognition, as illustrated in FIG. 5B.

FIGS. 5C to 5F illustrate the user inputting handwritten characters in the plurality of discrete areas 97. There is only one character input associated with each one of the areas 97 in this particular embodiment. In other embodiments there may be more than one character input associated with each area 97. The processor 3 can recognize the input of each area 97 independently of the inputs associated with the other areas 97.

Figure 5C:
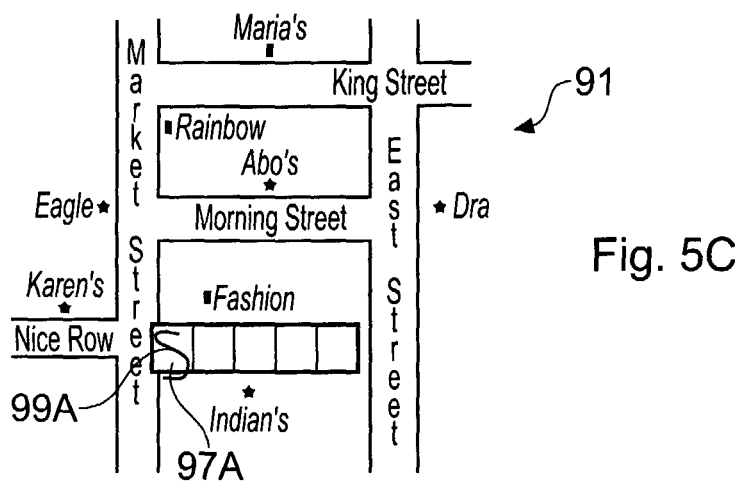
Figure 5D:
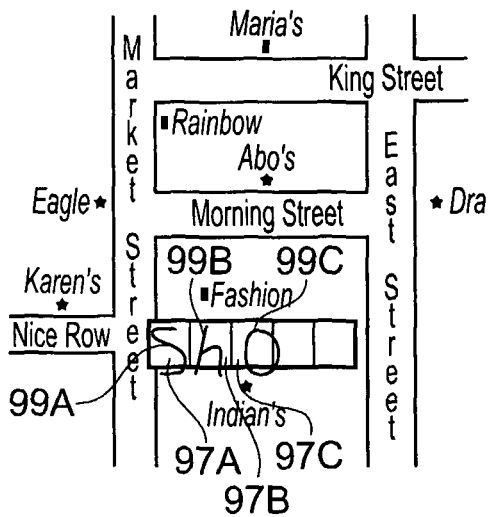

In FIG. 5C the user has made a first character input 99A corresponding to a letter "s". This input may be made by tracing a stylus 57 across the touch sensitive display 11 in the shape of a letter s. In FIG. 5D the user has made two more character inputs corresponding to a letter "h" 99B and a letter "o" 99C in the areas 97B and 97C respectively.

Figure 5E:
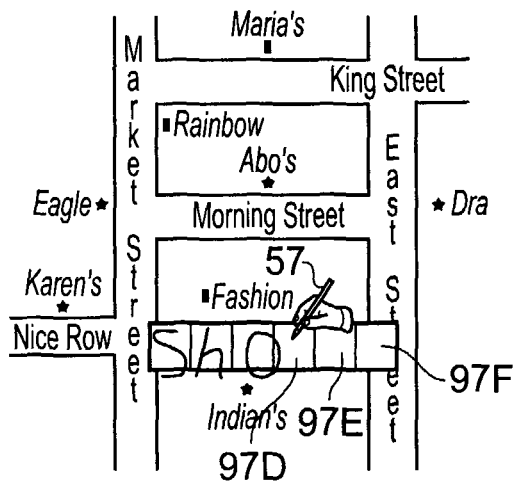
Figure 5F:
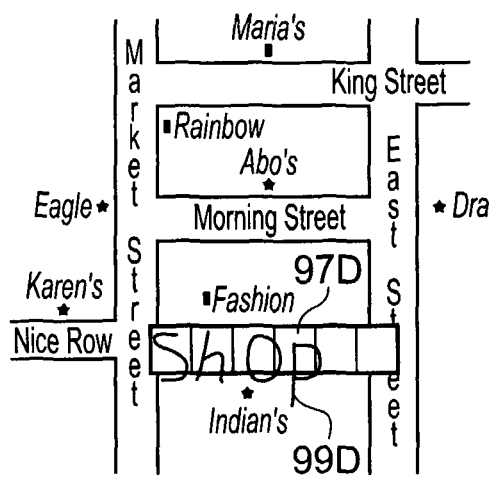

In FIG. 5E the user begins to make a further input in the area 99D. As this is the next to last available area, the processor 3 detects that the user is running out of areas available for character inputs and so controls the display 11 to present an extra area 97F adjacent to the last available area 97E. In FIG. 5F the user has made a fourth character input 99D corresponding to the letter "p" in the area 97D.

In this embodiment the character inputs leave handwritten traces on the display 11. In other embodiments these traces may be replaced by typographic characters once the processor 3 has recognized each of the character inputs. By recognizing each character input independently, the processor 3 can recognize the series of character inputs as the word "shop".

Figure 5G:
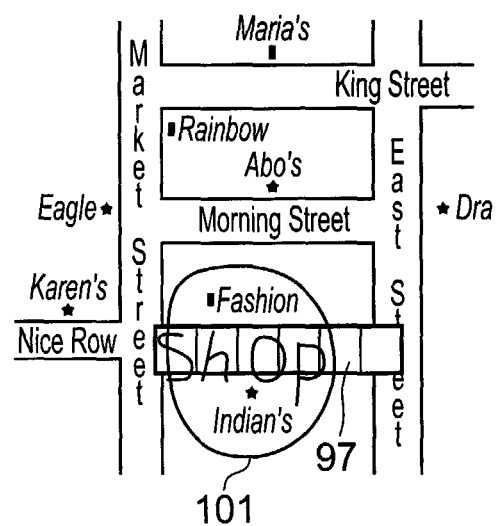
Figure 5H:
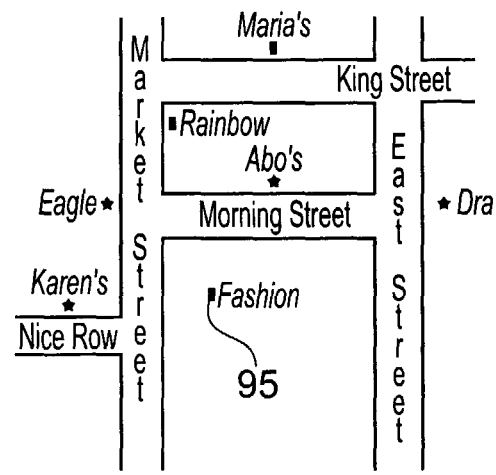

In FIG. 5G the user makes an input outside of the plurality of discrete areas 97. This input is recognized as a gesture. In the example illustrated the gesture input 101 is a circle around the character inputs 99 made in the plurality of discrete areas 97. When the processor 3 detects the gesture input 101 as completed it recognizes the gesture input 101 and then controls the device 1 to perform the function associated with the gesture. The processor 3 may detect the gesture input as completed when no further input occurs for a predetermined length of time. Alternatively the processor 3 may detect the gesture input as completed if another input occurs elsewhere, for example, inside one of the plurality of discrete areas 97. In this particular example the processor 3 controls the device 1 to display all shops within the circle 101 drawn by the user, as illustrated in FIG. 5H.

Although embodiments of the present invention have been described in the preceding paragraphs with reference to various examples, it should be appreciated that modifications to the examples given can be made without departing from the scope of the invention as claimed.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plusfunction clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A method for an electronic device comprising a display, the method comprising:
    displaying a map illustrating a plurality of streets and establishments situated on the streets;
    receiving a prolonged input at an area on the map;
    in response to receiving the prolonged input, displaying a character input area comprising a plurality of discrete areas approximate to the area and overlying the map;
    receiving a character input in a character input area of the display;
    receiving a gesture input outside the character input area of the display, wherein the establishments are displayed prior to receiving the character input or the gesture input;
    displaying on the map one or more establishments associated with the character input; and
    removing from the map one or more establishments not associated with the character input.

2. The method of claim 1 wherein the character input is handwritten.

3. The method of claim 1 wherein the gesture input is received on the map section of the display.

4. The method of claim 1 wherein the gesture input selects a subset of the map.

5. The method of claim 4 wherein the displaying on the map one or more establishments associated with the character input is limited to the selected subset of the map.

6. The method of claim 4 wherein the gesture input is a circle.

7. The method of claim 1 wherein the gesture input comprises a series of traces.

8. The method of claim 1 wherein the character input comprises a plurality of characters.

9. The method of claim 1 wherein establishments comprise shops and restaurants.

10. The method of claim 1 further comprising displaying the character input area in a position related to the received character input.

11. An electronic device comprising:
    a display configured to display a character input area comprising a plurality of discrete areas;
    a user input for entering characters via the character input area; and
    a processor configured to:
        display a map illustrating a plurality of streets and establishments situated on the streets;
        receive a prolonged input at an area on the map;
        in response to receiving the prolonged input, display the character input area approximate to the area and overlying the map;
        receive a character input in the character input area;
        receive a gesture input outside the character input area, wherein the establishments are displayed prior to receiving the character input or the gesture input;
        display on the map one or more establishments associated with the character input; and
        remove from the map one or more establishments not associated with the character input.

12. The device of claim 11 wherein the character input is handwritten.

13. The device of claim 11 wherein the gesture input is received on the map section of the display.

14. The device of claim 11 wherein the gesture input selects a subset of the map.

15. The device of claim 14 wherein the display on the map one or more establishments associated with the character input is limited to the selected subset of the map.

16. The device of claim 14 wherein the gesture input is a circle.

17. The device of claim 11 wherein the gesture input comprises a series of traces.

18. The device of claim 11 wherein the character input comprises a plurality of characters.

19. The device of claim 11 wherein establishments comprise shops and restaurants.

20. The method of claim 1, wherein the removing from the map one or more establishments not associated with the character input is in response to detecting that the gesture input is completed, and wherein the method further comprises removing the character input area from the display, in response to detecting that the gesture input is completed.

* * * * *